(12) United States Patent
Tsutsumi et al.

(10) Patent No.: US 8,574,750 B2
(45) Date of Patent: *Nov. 5, 2013

(54) SEALED BATTERY TO WITHSTAND INTERNAL PRESSURES AND BATTERY MODULE USING SAME

(75) Inventors: Kazuo Tsutsumi, Kobe (JP); Kazuya Nishimura, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 13/427,645

(22) Filed: Mar. 22, 2012

(65) Prior Publication Data

US 2012/0177958 A1  Jul. 12, 2012

Related U.S. Application Data

(63) Continuation of application No. 12/898,511, filed on Oct. 5, 2010, now Pat. No. 8,158,278, which is a continuation of application No. PCT/JP2009/001254, filed on Mar. 19, 2009.

(30) Foreign Application Priority Data

Apr. 11, 2008 (JP) ................................. 2008-103901

(51) Int. Cl.
*H01M 2/02* (2006.01)
(52) U.S. Cl.
USPC ............... 429/169; 429/98; 429/99; 429/157; 429/158; 429/163

(58) Field of Classification Search
USPC ...................... 429/98, 99, 157, 158, 163, 169
See application file for complete search history.

(56) References Cited

U.S. PATENT DOCUMENTS

| | | | |
|---|---|---|---|
| 5,800,942 A * | 9/1998 | Hamada et al. | 429/148 |
| 6,304,057 B1 | 10/2001 | Hamada et al. | |
| 6,492,058 B1 | 12/2002 | Watanabe et al. | |
| 2004/0188245 A1* | 9/2004 | Katayama et al. | 204/252 |

(Continued)

FOREIGN PATENT DOCUMENTS

| EP | 1 734 599 | 12/2006 |
|---|---|---|
| EP | 1 744 383 | 1/2007 |

(Continued)

OTHER PUBLICATIONS

Russian Patent Application No. 2010142991 Office Action dated Nov. 3, 2011, 7 pages with English translation.

(Continued)

*Primary Examiner* — Zachary Best

(57) ABSTRACT

A sealed rectangular battery excellent in volumetric efficiency and pressure resistance is provided. The sealed rectangular battery includes an electrode group having a positive electrode and a negative electrode and a cell casing for accommodating therein the electrode group and an electrolyte solution, which casing includes a rectangular frame member, a first lid member and a second lid member. Each of the first and second lid members includes a body portion for covering one of the openings of the frame member, and a side portion formed so as to protrude from the body portion substantially along at least one set of sides opposite to each other.

18 Claims, 12 Drawing Sheets

(56) References Cited

U.S. PATENT DOCUMENTS

| | | | |
|---|---|---|---|
| 2004/0237293 A1* | 12/2004 | Durkot et al. .................. 29/730 |
| 2005/0123815 A1 | 6/2005 | Tsai et al. |
| 2005/0260493 A1 | 11/2005 | Frederiksson et al. |
| 2007/0231687 A1 | 10/2007 | Kim et al. |
| 2007/0254211 A1 | 11/2007 | Kambe et al. |
| 2009/0220853 A1 | 9/2009 | Yang et al. |
| 2011/0027630 A1 | 2/2011 | Tsutsumi et al. |

FOREIGN PATENT DOCUMENTS

| | | | | |
|---|---|---|---|---|
| JP | 06-338304 | | 12/1994 | |
| JP | 06-349459 | | 12/1994 | |
| JP | 06338304 A | * | 12/1994 | ............. H01M 2/02 |
| JP | 2001-110381 | | 4/2001 | |
| JP | 2001-236937 | | 8/2001 | |
| JP | 2003-045385 | | 2/2003 | |
| JP | 2003-317795 | | 11/2003 | |
| JP | 2003317795 A | * | 11/2003 | ............. H01M 2/02 |
| RU | 1 279 466 | | 1/1995 | |
| TW | 567626 | | 12/2003 | |
| TW | 200522418 | | 7/2005 | |
| TW | 200810191 | | 2/2008 | |
| WO | 01/37353 | | 5/2001 | |
| WO | 2007/051199 | | 5/2007 | |
| WO | 2009/103523 | | 8/2009 | |

OTHER PUBLICATIONS

Taiwan Application No. 098109910 Office Action, dated Apr. 12, 2012, 14 pages with English translation.
Russian Patent Application No. 2010142991 Decision for Granting dated Mar. 1, 2012, 13 pages with English translation.
Korean Patent Application No. 10-2012-7028291 Office Action, dated Jan. 31, 2013, 12 pages with English translation.
European Application No. 09730781.3 Communication dated Apr. 9, 2013, 8 pages.
Japanese Patent Application No. 2010-507133 Notification for Reason(s) for Rejection, dated Nov. 13, 2012, 7 pages with English translation.
Chinese Patent Application No. 200980112693.0 Office Action dated Oct. 9, 2012, w/partial English translation.
Canadian Patent Application No. 2,726,864 Office Action dated Aug. 15, 2012, 2 pages.
Korean Patent Application No. 2010-7022751 Office Action dated Aug. 31, 2012, 15 pages including partial English translation.
European Application No. 09730781.3 Extended and Supplementary Search Report, dated Aug. 27, 2012, 19 pages.
Chinese Application No. 200980112693.0 Office Action dated May 16, 2013, 10 pages including partial English translation.
Japanese Patent Application No. 2010-507133 Notification of Reason(s) for Rejection, dated Jun. 4, 2013, 2 pages.

* cited by examiner

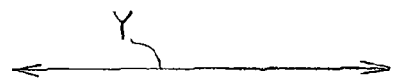
Fig. 4A
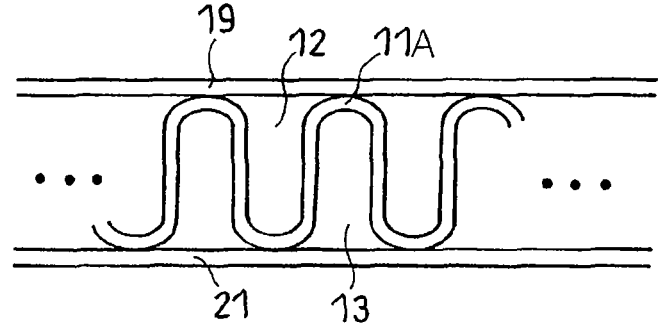
Fig. 4B
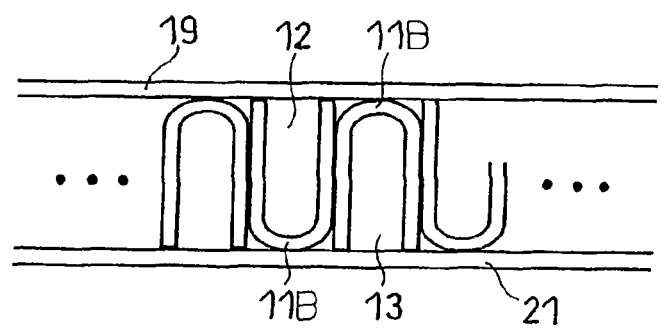
Fig. 4C
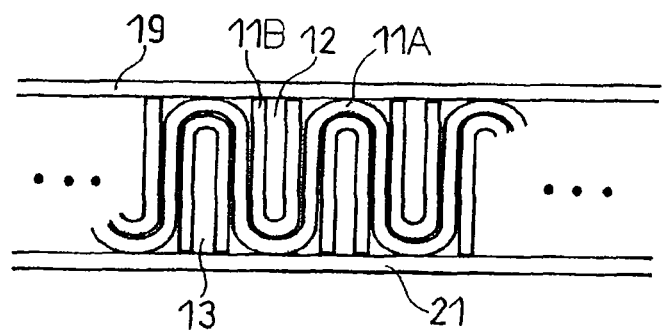

SEALED BATTERY TO WITHSTAND INTERNAL PRESSURES AND BATTERY MODULE USING SAME

CROSS REFERENCE TO THE RELATED APPLICATIONS

This is a continuation application from U.S. application Ser. No. 12/898,511 filed on Oct. 5, 2010, now U.S. Pat. No. 8,158,278, which is a continuation application, under 35 U.S.C. §111(a), of international application No. PCT/JP2009/001254, filed Mar. 19, 2009, which claims priority to Japanese patent application No. 2008-103901, filed Apr. 11, 2008, the disclosure of which is incorporated by reference in its entirety into this application.

BACKGROUND OF THE INVENTION

1. Field of the Invention

The present invention relates to a sealed rectangular battery having a pressure resistance to the internal pressure of the battery despite a simplified structure employed therein and, also, to a battery module using the plurality of sealed rectangular batteries.

2. Description of the Related Art

For the shape of the sealed battery, cylindrical shape has long been widely adopted. In the cylindrical battery, not only can a simplified structure, in which positive and negative electrode plates are wound in a cylindrical form with a separator intervening therebetween, be employed for an electrode assembly, but there is also such an advantage that the pressure resistance to the internal pressure of the battery is excellent.

In recent years, however, having focused on environmental concerns, new type of vehicles such as, for example, automobiles and electric railcars having a secondary battery that is rechargeable incorporated therein has been developed. Where the secondary battery is mounted on a vehicle, the electric power regenerated during the braking can be stored in the mounted battery so that the regenerated electric power can be used as a drive source for the vehicle, thus contributing to an increase of the energy efficiency.

SUMMARY OF THE INVENTION

In particular, such a battery for use in vehicles is required to have a high voltage and high energy capacity as compared with those of the conventional battery used in portable electric machines and equipments and therefore needs to be used in the form of a large sized battery. However, in the case where the large sized battery is used, since in terms of the battery performance and the productivity of the battery, the use is generally considered feasible of the battery of a design utilizing the electrode assembly which is made up of the positive and negative electrode plates stacked alternately to each other, rather than the electrode group of a winding type generally used in the cylindrical battery, and since there is a large necessity towards the efficient utilization of a space for installation of the battery, a battery of a rectangular configuration is preferred rather than that of a cylindrical configuration. (See the Patent Document 1 listed below.)

In the meantime, the electrode group of a stacked structure generally has a propensity of inflating in a direction conforming to the direction of stacking and, as a result of swelling of the electrode group, the battery expands. Also, where a large sized rectangular battery is to be constructed, the battery is apt to swell by the effect of an increase of the internal pressure inside the battery since the surface area of a flat portion, which receives the pressure inside the battery, is large. In order to suppress those problems, the wall thickness of an accommodating member for accommodating the electrode group is generally required to be increased, but in such case, the volume and the weight of the battery increase. In general, where the battery is to be mounted for use in driving the vehicle, the battery is often mounted as a component additional to the conventional mechanism and the space for installation of the battery is limited. In addition, in terms of the energy efficiency in driving the vehicle, the battery so mounted is desired to have as light weight as possible.

Also, where a plurality of rectangular batteries are to be stacked in a plurality so that they can be used as a battery module, there is a need to fasten and fix the cell stacked body in a direction conforming to the direction of stacking in order to suppress the inflation of the cell stacked body, in which unitary cells are stacked, in the direction conforming to such lamination. Considering the space for installation of the battery module in the above described vehicle and the energy efficiency in driving the vehicle, the use of members for fastening and fixing the cell stacked body is required to be dispensed as far as possible and the battery module is required to be assembled compact in size and small in weight.

[Patent Document 1] JP Laid-open Patent Publication No. 2001-110381

In view of the foregoing, the present invention has been devised to substantially eliminate the above discussed problems and inconveniences and is intended to provide a sealed rectangular battery, which is excellent not only in volume efficiency but also in pressure resistance with a simplified structure and which is lightweight. Another important object of the present invention is to provide a battery module comprised of a plurality of sealed rectangular batteries of a type referred to above and stacked together, which can be assembled compact in size and light weight while the laminate of the sealed rectangular batteries are fastened in a direction conforming to the direction of stacking to thereby suppress the undesirable inflation of the cell stacked body.

In order to accomplish the foregoing objects, a sealed rectangular battery in accordance with the present invention includes an electrode group having a positive electrode and a negative electrode; and a cell casing for accommodating the electrode group and an electrolyte solution, made up of a rectangular frame member and first and second lid members; in which the first lid member includes a body portion for covering one of openings of the frame member, and side portions protruding from the body portion substantially along at least one pair of sides of the frame member opposite to each other; and in which the second lid member includes a body portion for covering the other of the openings of the frame member, and side portions protruding from the body portion substantially along at least one pair of sides of the frame member opposite to each other.

According to the present invention, since the force of swelling resulting from an increase of the internal pressure of the battery can be counteracted by the body portions and respective tensile stresses of the edge portions of the first and second lid members, which are bent from the body portions, the resistance of the battery to the pressure can be increased with a simplified structure. Also, since it is possible to increase the volumetric efficiency when the battery is shaped to represent not a cylindrical shape, but a rectangular shape and, also, to reduce the weight and the volume of the battery when the wall thickness of each of the first and second lid members is reduced, it is indeed significant to a large sized battery that is used in vehicles or the like.

In one embodiment of the present invention, the electrode group may be of a structure comprising a positive electrode plate that forms the positive electrode, and a negative electrode plate that forms the negative electrode, the positive and negative electrode palates being alternately stacked together in a predetermined direction through a separator intervening between those positive and negative electrode plates, each of the first and second lid members including a pair of the side portions opposed to each other in the direction of stacking of the electrode group. The electrode group in this case may alternatively be of a stacked structure, in which the positive electrode plate forming the positive electrode and the negative electrode plate forming the negative electrode are alternately stacked together so as to confront each other through a pleated separator or through a separator having pockets.

Particularly in the case of manufacture of the large sized battery, it is preferred in terms of the permeability of the electrolyte and the productivity to use the electrode group having the stacked structure, rather than the conventional electrode group of a winding type, but in the case of the electrode group of the stacked structure, the electrode group has a propensity of being inflated or expanded in the direction of stacking. Accordingly, when the structure of each of the first and second lid members employed in the practice of the present invention is applied to the electrode group of a pleated structure, swelling of the battery can be suppressed and advantages brought about by the electrode group of the pleated structure can be secured.

In one embodiment of the present invention, the first lid member may include a body portion for covering one of the openings of the frame member, and four side portions formed by bending an edge portion integral with the body portion so as to extend substantially along respective four sides of the rectangular frame member; and the second lid member may include a body portion for covering one of the openings of the frame member, and four side portions formed by bending an edge portion integral with the body portion so as to extend substantially along respective four sides of the rectangular frame member. The provisions of the four side portions in the frame member in correspondence with the four sides of the latter are effective to further assuredly suppress the inflation of the battery.

In the sealed rectangular battery of the structure described above, the frame member may be made of, for example, an insulating material and the first lid member may then be a positive electrode side terminal connected with the positive electrode whereas the second lid member may be a negative electrode side terminal connected with the negative electrode. When the first and second lid members are concurrently used as the positive and negative electrode side terminals, respectively, there is no need to use any extra terminal member. Also, since lamination of the batteries can result in a series connection of those batteries, in the case where a plurality of the rectangular batteries are used as a battery module, the structure of such battery module can be simplified to facilitate assemblage thereof.

Also in the sealed rectangular battery of the structure according to one embodiment of the present invention, each of the first and second lid members may be made of a nickel-plated steel material. By applying a nickel plating to a steel material, not only can the contact resistance among the unitary cells be reduced, but also the resistance to corrosion can be increased.

In the sealed rectangular battery according to one embodiment of the present invention, the use is preferred of a terminal for use in monitoring a battery voltage. Where the plural unitary cells are combined to enable them to be used as a battery module, the status of charging in each of the unitary cells can be monitored and, therefore, trouble shooting in the event of occurrence of a trouble in one or some of the unitary cells and detection of any variation in performance among those unitary cells can readily be accomplished.

The present invention also provides a battery module which includes a cell stacked body of a substantially rectangular configuration formed by stacking a plurality of unitary cells, each being in the form of the sealed rectangular battery as defined above, the unitary cells being stacked together in a direction in which the first lid member of one of the neighboring unitary cells and the second lid member of the other of the neighboring unitary cells are opposed to each other; a pair of side face reinforcing members extending along opposite side faces of the cell stacked body in the direction of stacking; plate-shaped compressing members secured respectively to a front end portion and a rear end portion of the pair of the side face reinforcing members in the direction of stacking of the cell stacked body so as to cover front and rear regions of the cell stacked body; and clamping members supported by the front and rear compressing members for clamping the cell stacked body from a front side and a rear side, respectively, in the direction of the stacking of the cell stacked body.

By so constructing as herein above described, the pressure of the cell stacked body in the direction of stacking can be secured by means of the side face reinforcing member, arranged on each of the side faces of the cell stacked body, for example, a side face plate covering each of the side faces of the cell stacked body. In other words, separate from a member for protecting each of the side faces of the cell stacked body, there is no need to use any clamping member for fastening the cell stacked body in the direction of stacking and, therefore, the size and the weight of the battery module can be reduced advantageously.

Each of the side face reinforcing members may be in the form of a plate-shaped side face plate covering the corresponding side face of the cell stacked body, and the side face plate has opposite edge portions opposed along a vertical direction, which is perpendicular to the direction of stacking, the edge portions being bent towards the side of the cell stacked body. If the side face reinforcing member is so structured as hereinabove described, the mechanical strength of the side face plate can be increased by the upper and lower edge portions that have been bent as hereinabove described, and, therefore, without any reinforcing member added, not only can a plurality of battery modules be stacked one above the other for installation on, for example, a vehicle, but also such installation can be facilitated. In addition, because of the side face plates used, swelling of the cell stacked body in respective directions laterally thereof can be suppressed advantageously.

Each of the clamping members employed in the battery module of the present invention may be a screw member capable of being threadingly engaged in a screw hole defined in each of the compressing members. In such case, the pressure to be applied to the cell stacked body in the direction of stacking is adjustable depending on the extent to which the screw member is threaded. By so constructing, assemblage of the battery module can be facilitated. Also, since after the assemblage of the battery module, adjustment of the pressure in the direction of stacking, which markedly affects the performance of the battery module, can be easily and accurately performed by fastening the screw members, the quality control of the battery module can be accomplished precisely.

Yet, the battery module of the present invention may also additionally includes a first collector member urged by the clamping member to contact the first lid member that forms is an end portion of the cell stacked body, and a second collector member urged by the clamping member to contact the second lid member that forms the opposite end portion of the cell stacked body. The provision of the first and second collector members in the battery module of the present invention makes it possible to achieve a mechanical protection of the cell stacked body and reduction of the internal resistance simultaneously. In particular, the surface area of contact between the unitary cells and each of the first and second collector plates can be increased to reduce the contact resistance and, therefore, the internal resistance of the battery module can be reduced considerably.

The battery module of the present invention may additionally include a casing made of an insulating material for covering a module body including the cell stacked body and electroconductive component parts fitted therearound. By so designing, the module body can be electrically protected with a simplified structure.

Where the battery module of the present invention makes use of the casing made of the electrically insulating material as hereinbefore described, the casing may be preferably fitted to the module body by means of a first casing fitting member, which is a metallic screw member and extends through the compressing member to fasten the cell stacked body, and a second casing fitting member, which is a screw member made of an insulating material and is threadingly engaged with the first casing fitting member so as to extend through the casing. By so configuring, by the utilization of the compressing members for applying the pressure to the cell stacked body in the direction of stacking and the first casing fitting member, the casing can be fitted to the module body and, therefore, the number of additional members required to fit the casing can advantageously be minimized along with reduction in size and weight of the battery module.

The battery module in accordance with one embodiment of the present invention may additionally include a pressure regulating mechanism for discharging gases, developed inside the cell stacked body, to the outside in the event of increase of an internal pressure of the cell stacked body to a predetermined value. The use of the pressure regulating mechanism makes it possible to further increase the pressure resistance of the battery.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4A is a schematic diagram showing an example of a stacked structure of an electrode group shown in FIG. 2, in which a pleated separator is employed;

FIG. 4B is a schematic diagram showing another example of the stacked structure of the electrode group, in which a separator having pockets is employed;

FIG. 4C is a schematic diagram showing a further example of the stacked structure of the electrode group, in which a combination of the pleated separator and the separator having pockets is employed;

DETAILED DESCRIPTION OF THE EMBODIMENTS

While embodiments of the present invention will be described in detail with particular reference to the accompanying drawings, those embodiments should not be construed as limiting the scope of the present invention.

Figure 1:
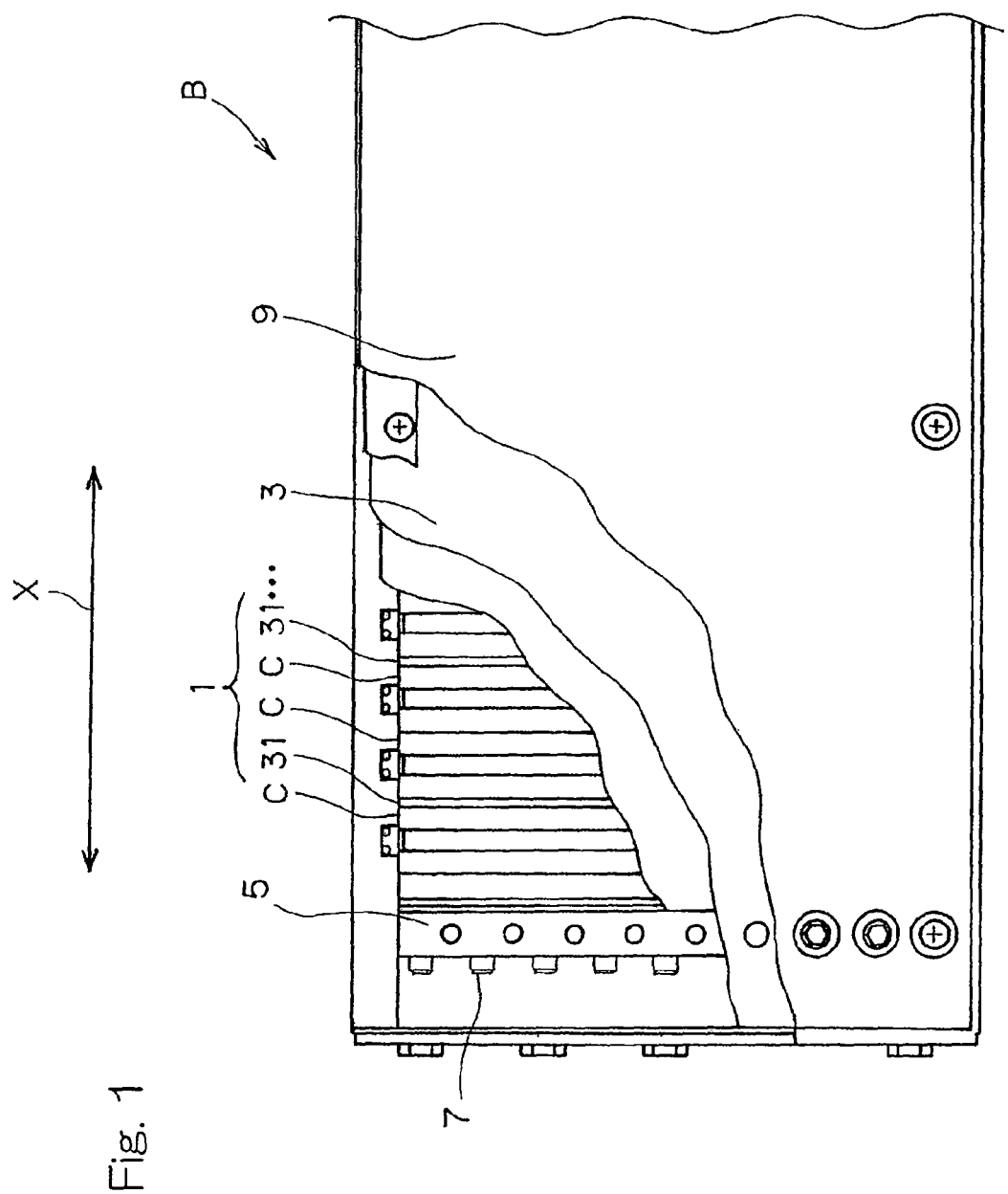
FIG. 1 is a partially cutaway side view of a battery module according to one embodiment of the present invention.

FIG. 1 is a partially cutaway side view schematically showing the structure of a battery module B according to one embodiment of the present invention. The illustrated battery module B is of a type that is mounted on, for example, a railcar and includes a cell stacked body 1, made up of major component parts including a plurality of (for example, 30 in the instance as shown) unitary cells C in the form of sealed rectangular batteries, which are stacked together in a direction conforming to the direction of thickness of each of the unitary cells C, side plates 3, compressing plates 5 and clamping bolts 7 used to fasten and fix the cell stacked body 1 in a direction conforming to the direction X of stacking. Those major component parts are enclosed within a casing 9 made of an electrically insulating material. The battery module B will be described in detail later.

Figure 2:
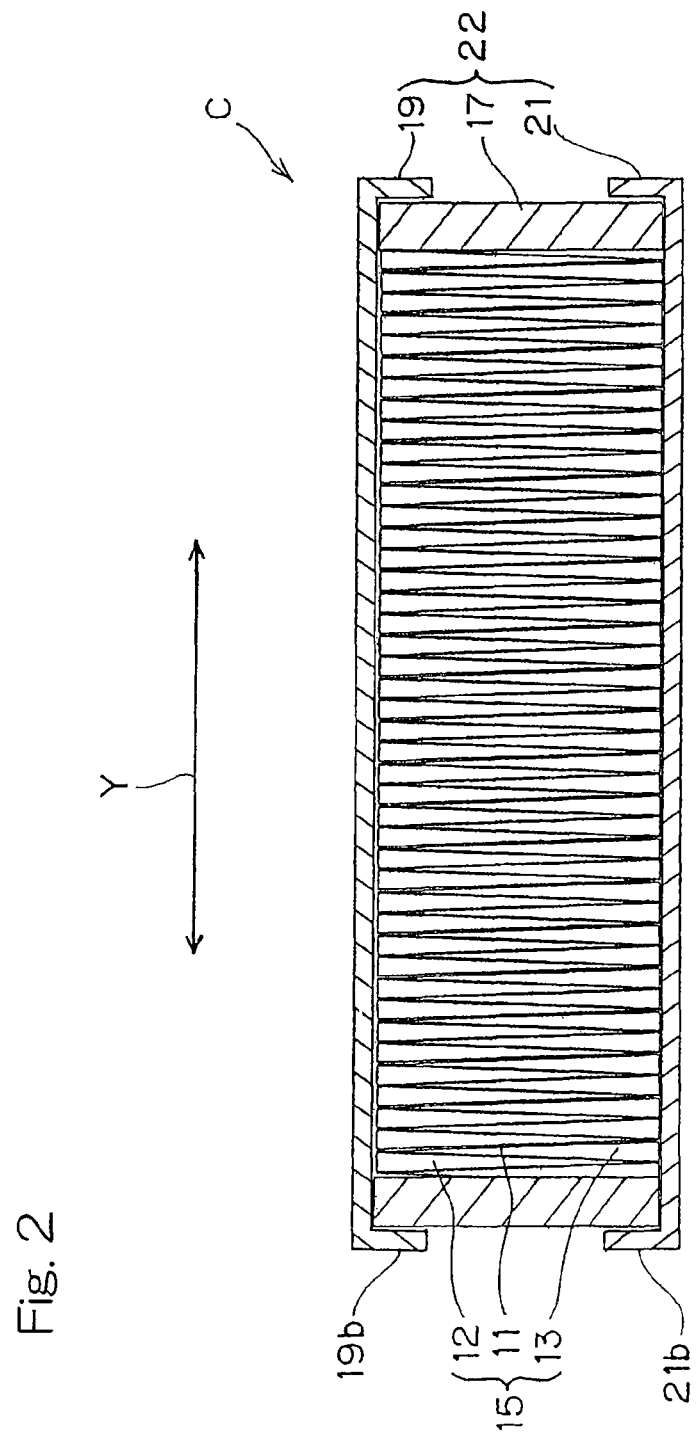
FIG. 2 is a sectional view of a sealed rectangular battery used to form the battery module shown in FIG. 1.

Referring now to FIG. 2, there is shown a schematic sectional view of one of the unitary cells C shown in and described with reference to FIG. 1. As shown therein, the unitary cell C includes an electrode group 15 having a separator 11, a plurality of positive electrode plates 12, forming a positive electrode, and a plurality of negative electrode plates 13 forming a negative electrode. The unitary cell C also includes a rectangular frame member 17, a first lid member 19 and a second lid member 20 defining therebetween a space for accommodating the electrode group 15 together with a quantity of electrolyte solution. More specifically, the frame member 17 and the first and second lid members 19 and 21 cooperate with each other to form a cell casing 22 for accommodating the electrode group 15 and the electrolyte solution. It is to be noted that the unitary cell C in the illustrated embodiment is a repeatedly rechargeable, nickel metal-hydride secondary battery containing a capital positive electrode active material in the form of nickel hydroxide, a capital negative electrode active material in the form of a hydrogen absorbing alloy and the electrolyte in the form of an aqueous alkaline solution.

Figure 3:
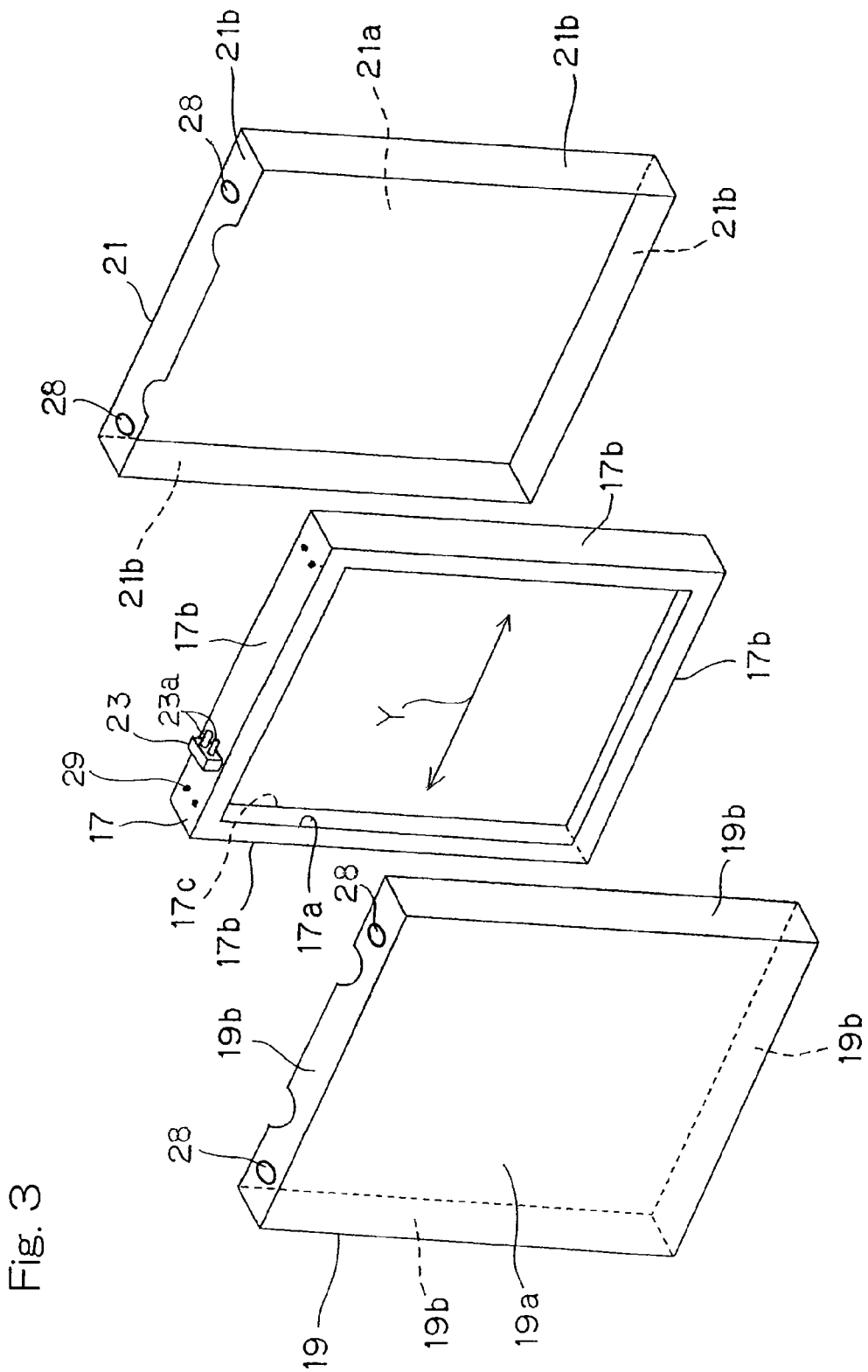
FIG. 3 is a perspective view showing lid members and a frame member both used in the sealed rectangular battery shown in FIG. 2.

As best shown in FIG. 3, the first lid member 19 includes a substantially flat body portion 19a, covering one opening 17a of opposite openings of the frame member 17 and having four edge portions in the form of four side portions 19b formed integrally with respective four sides of the flat body portion 19a by, for example, bending the edge portions so as to protrude along respective four sides 17b of the frame member 17 and to cover a portion of an outer peripheral surface of the frame member 17. The second lid member 21 is of a structure, substantially identical with that of the first lid member 19, having a substantially flat body portion 21a and side portions 21b, covering the other opening 17 of opposite openings of the frame member 17.

It is to be noted that although in the illustrated embodiment, the side portions 19b or 21b employed in each of the first and second lid members 19 and 21 and neighboring to each other are not connected together, they may be connected together by means of welding or the like. Also, each of the side portions 19b or 21b may be formed, instead of by bending, by welding corresponding flange pieces, separate from the body portion 19a or 21a, to the four side edges of the body portion 19a or 21a.

As shown in FIG. 2, the electrode group 15 referred to above is of a stacked structure, in which the positive electrode plates 12 and the negative electrode plates 13 are alternately stacked in a predetermined direction through a separator 11. Specifically, the electrode group 15 may employ a pleated structure, in which the positive electrode plates 12 and the negative electrode plates are alternately stacked and opposed to each other through a pleated or corrugated separator 11A having a plurality of folds, as shown in FIG. 4A. It is to be noted that in the illustrated embodiment, the electrode group 15 has a stacked structure stacking in a direction Y lying from one of the side portions 17b and 17b of the rectangular frame member 17, which are opposed to each other in a direction leftwards and rightwards as viewed in FIG. 3, towards the other of the side portions 17b and 17b of the rectangular frame member 17.

The electrode group 15 may employ other type of the stacked structure than the pleated structure. For example, as shown in FIG. 4B, the separator 11 may include a plurality of individual separators 11B each having a pocket, through which the positive and negative electrode plates 12 and 13 are alternately stacked and opposed to each other. Alternatively, as shown in FIG. 4C, the positive electrode plates 12 and the negative electrode plates 13 accommodated in respective individual separators 11B may be alternately stacked so as to confront each other through the pleated separator 11A.

It is to be noted that although in describing the embodiment as set forth above, each of the first and second lid members 19 and 21 has been shown and described as having the four side portions 19b or 21b one for each of the four side portions 17b of the frame member 17, it may be so designed and so configured as to have only one pair of side portions 19b or 21b opposite to each other in association with only one pair of the side portions 17b, 17b of the frame member 17 that are opposed to each other. In such case, it is preferred that the pair of the side portions 19b or 21b be opposed to each other in the direction Y of stacking of the electrode group 15. Alternatively, one of the first and second lid members 19 and 21, for example, the first lid member 19 may have the side portions 19b opposed to each other in the direction Y of stacking of the electrode group 15 whereas the other of the first and second lid members, that is, the second lid member 21 may have the side portions 21b opposed to each other in a direction perpendicular to the direction Y of stacking of the electrode group 15.

In the embodiment described hereinabove, the first and second lid members 19 and 21 are each prepared from a nickel-plated steel sheet and are electrically connected respectively with the positive electrode and the negative electrode. In other words, the first and second lid members 19 and 21 concurrently serves as a positive electrode side terminal and a negative electrode side terminal of each unitary cells C, respectively. It is, however, to be noted that material for the first and second lid members 19 and 21 may not be always limited to the nickel-plated steel sheet referred to above, but may be any suitable material selected in consideration of electrochemical properties, mechanical strength and corrosion resistance that are required in the unitary cell or the battery module. Also, the first and second lid members 19 and 21 may be made of respective materials different or dissimilar from each other. As regards the frame member 17, it is made of an electrically insulating material since the first and second lid members 19 and 21 have to be electrically insulated from each other. For the electrically insulating material for the frame member 17, a modified polyphenylene ether resin (PPE) is employed in the practice of the embodiment now under discussion, but any suitable material may be selected for the frame member 17 in consideration of the mechanical strength, the heat resistance and the resistance to electrolyte solution used.

The unitary cell C according to the embodiment now under discussion is, as best shown in FIG. 3, provided with a gas vent port 23 defined in one of the four side portions 17b of the frame member 17, which is oriented upwards, that is, the upper side portion 17b, for the discharge therethrough of internal gases developed inside the unitary cell C. The gas vent port 23 is of a structure having bifurcated discharge passageways 23a defined therein so as to protrude in a direction substantially parallel to the upper side portion 17b, where the gas vent port 23 is defined, towards an intermediate portion of the frame member 17, thus forming a part of a pressure regulating mechanism 70 of the battery module B as will be described in detail later.

Figure 5A:
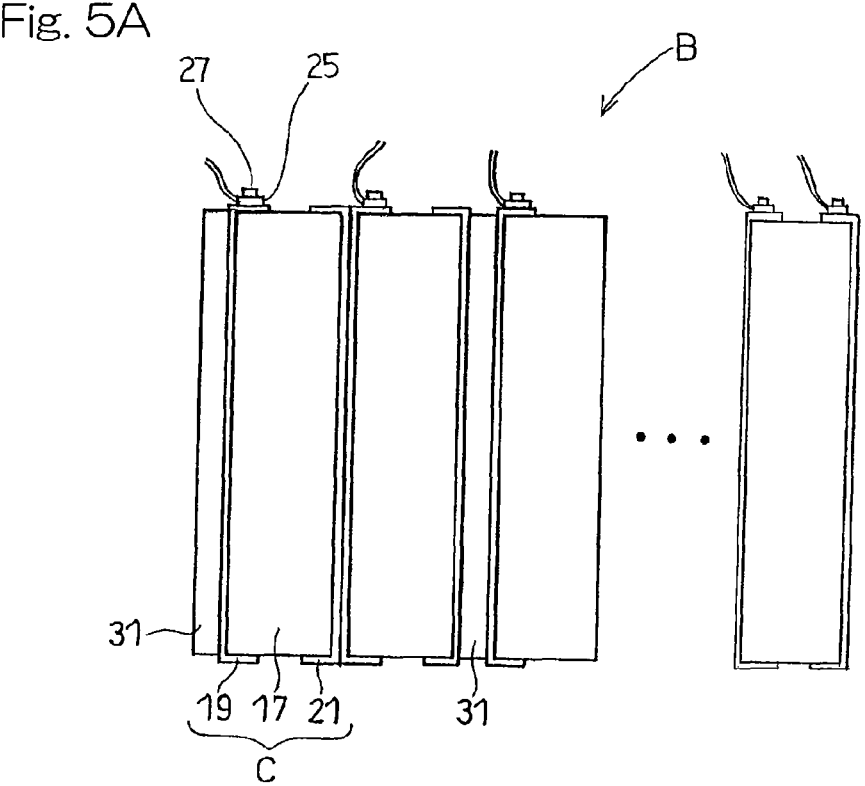
FIG. 5A is a schematic diagram showing the battery module comprised of the sealed rectangular batteries each provided with a voltage monitoring terminal in accordance with one embodiment of the present invention.
Figure 5B:
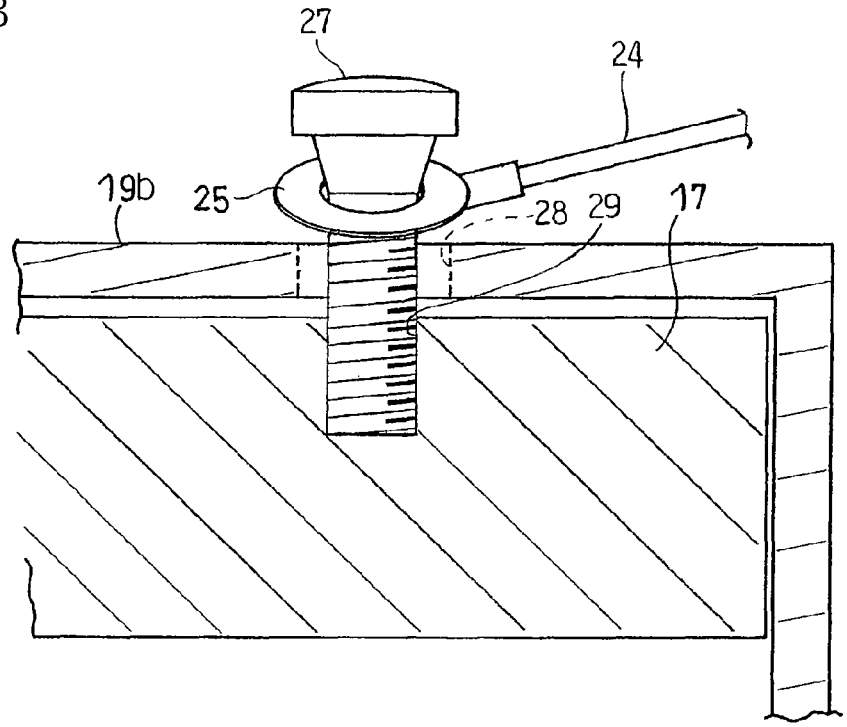
FIG. 5B is a schematic sectional view showing the structure of each of the voltage monitoring terminal in each of the sealed rectangular batteries shown in FIG. 5A.

Also, each of the unitary cells C is preferably provided with a voltage monitoring terminal so that the voltage of each of the unitary cells C can be monitored. Although the voltage monitoring terminal may be employed in a pair, one for each of the positive and negative electrode sides, the single voltage monitoring terminal is preferably shared commonly for the respective positive and negative electrode sides of the neighboring unitary cells C of the battery module B as shown in FIG. 5A. For the voltage monitoring terminal, an eyelet terminal piece 25 connected with one end of a lead line 24 may be employed as shown in, for example, FIG. 5B. (It is to be noted that only the voltage monitoring terminal on the side of the first lid member 19 is exemplarily shown in FIG. 5B.) The eyelet terminal piece 25 is secured to the unitary cell C with a terminal connecting bolt 27 firmly threaded into a terminal fitting screw hole 29, defined in the upper side portion 17*b* of the frame member 17, after having been passed through the eyelet in the terminal piece 25 and then through a generally oval terminal fitting hole 28 defined in the upper side portion 19*b* of the first lid member 19. By so doing, the eyelet terminal piece 25 is fitted to the unitary cell C in a condition held in electrical connection with the first lid member 19, which serves as the positive electrode side terminal.

Figure 6:
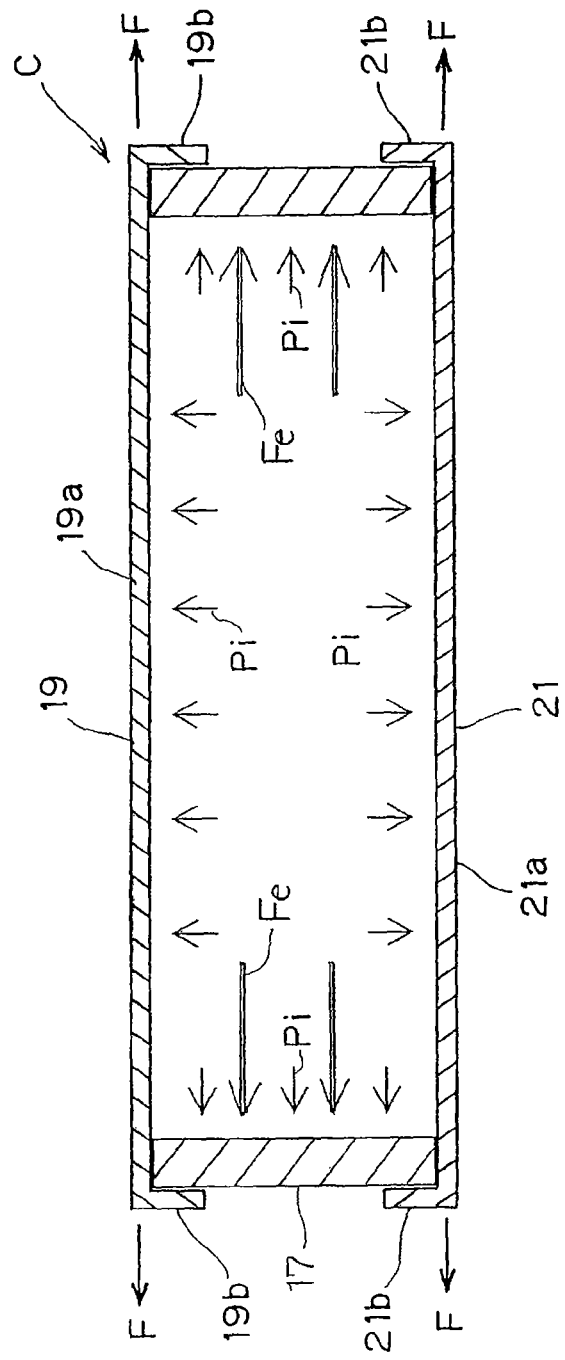
FIG. 6 is a schematic sectional view of the sealed rectangular battery of FIG. 2, showing the manner in which a force is developed in the sealed rectangular battery.

The unitary cell C forming the sealed rectangular battery in accordance with the embodiment has the following effects and advantages. Specifically, as shown in the schematic sectional view in FIG. 6, when the internal gas pressure developed inside the unitary cell C increases, the pressure Pi so increased is, applied not only to the respective flat body portions 19*a* and 21*a* of the first and second lid members 19 and 21 to urge them in a direction perpendicular to any of the flat body portions 19*a* and 21*a*, but also to the respective side portions 19*b* and 21*b* of the first and second lid members 19 and 21 to urge them in a direction outwardly of the frame member 17 by the effect of flexure of the frame member 17, that is, in a direction parallel to any of the flat body portions 19*a* and 21*a*. Although absent the side portions 19*b* and 21*b* in the respective flat body portions 19*a* and 21*a* of the first and second lid members 19 and 21, the flat body portions 19*a* and 21*a* will inflate considerably outwardly with the unitary cell C consequently swelled, the embodiment described hereinabove is such that the forces imposed on the side portions 19*b* and 21*b* act as tensile forces F acting on the flat body portions 19*a* and 21*a*, respectively. Accordingly, the swelling or inflation in a lateral direction of the unitary cell C, that is, in the direction X of stacking of the unitary cells C, which is brought about by the flexure of the flat body portions 19*a* and 21*a*, can be suppressed considerably.

Also, where the electrode group 15 of the stacked structure is employed such as in the embodiment described hereinabove, the electrode group 15 has a propensity of swelling in the direction Y of stacking as a result of repeated charging and discharging. Therefore, the frame member 17 is exposed not only to the gas pressure Pi, but also to a force Fe from the electrode group 15 acting in a direction along the direction Y of stacking. However, since the side portions 19*b* and 21*b* are employed at respective positions confronting the direction Y of stacking, the swelling of the unitary cell C in the direction of stacking can be suppressed and, at the same time, any force induced by the swelling of the electrode group does after all act as a tensile force F acting on each of the flat body portions 19*a* and 21*a*. Accordingly, the swelling of the unitary cell C can further effectively suppressed while such an advantage of the electrode group 15 of the stacked structure in respect of the productivity and the permeability of the electrolyte, which can be found in a large sized rectangular battery, is secured.

In other words, while the lid members have hitherto been required to have an increased wall thickness in order to suppress the swelling brought about by the internal pressure inside the battery, the provision of the side portions 19*b* and 21*b* in the respective first and second lid members 19 and 21, which are formed by bending, has made it possible to reduce the wall thickness of each of those lid members considerably and, therefore, the volume and the weight of the unitary cell C can be reduced along with increase of the resistance to pressure.

Also, as hereinabove described, the frame member 17 is made of the modified PPE resin having an electric insulating property, each of the first and second lid members 19 and 21 is prepared from the nickel-plated steel sheet having an electroconductive property, and the first and second lid members 19 and 21 are electrically connected respectively with the positive and negative electrodes. Accordingly, the first lid member 19 and the second lid member 21 function as a positive electrode side terminal member of the unitary cell C and a negative electrode side terminal member of the same unitary cell C, respectively. In such case, where the plurality of the unitary cells C are used as a battery module B having those unitary cells C stacked together as shown in FIG. 1, those unitary cells C can be readily connected in series with each other when the first lid member 19 of one of the neighboring unitary cells C is held in contact with the second lid member 21 of the other of the neighboring unitary cells C. Accordingly, no additional connecting member is required and, hence, the battery module B can have a reduced size and a reduced weight, and assemblage thereof can also be simplified. In addition, since each of the first and second lid members 19 and 21 is prepared from the steel sheet that is nickel plated as hereinbefore described, the contact resistance between or among the unitary cells C can be reduced advantageously. In view of the foregoing, evolution of heat in each of the unitary cells or the battery module by the effect of the Joule heat developed during charging and discharging can be suppressed to allow the battery performance to be increased. By way of example, where each of the unitary cells C is employed in the form of the nickel metal-hydride secondary battery as is the case in the embodiment hereinabove described, characteristics such as the charging and discharging cycle life and the charging efficiency can be increased.

Furthermore, each of the unitary cells C referred to in the embodiment described hereinabove is provided with the voltage monitoring terminal for use in monitoring the battery voltage. Accordingly, in the event of use of the battery module B having the plural unitary cells C stacked together as shown in FIG. 5A, the state of charge can be monitored for each of the unitary cells C and, hence, any trouble occurring in one or some of the unitary cells C can readily be traced. Moreover, since the voltage monitoring terminal can also be used as a terminal member for use in monitoring the status of charging and/or discharging or for use in controlling the charging and/or discharging, the system required to minimize any variation in performance among those unitary cells C, which tends to occur during the repeated charging and discharging, can easily be configured, thus contributing to increase in performance of the battery module B.

Hereinafter, the details of the battery module B so formed by the use of the plurality of the unitary cells C will be described. The cell stacked body 1 forming the battery module B according to this embodiment is of a type, in which as shown in FIG. 1, the plural unitary cells C and heat sink plates 31 of a structure as will be described later are stacked together. The unitary cells C are stacked together with the first lid member 19 of one of the neighboring unitary cells C held in face-to-face relation with the second lid member 21 of the other of the neighboring unitary cells C, in which one heat sink plate 31 is employed and intervened every two unitary cells C.

Figure 7:
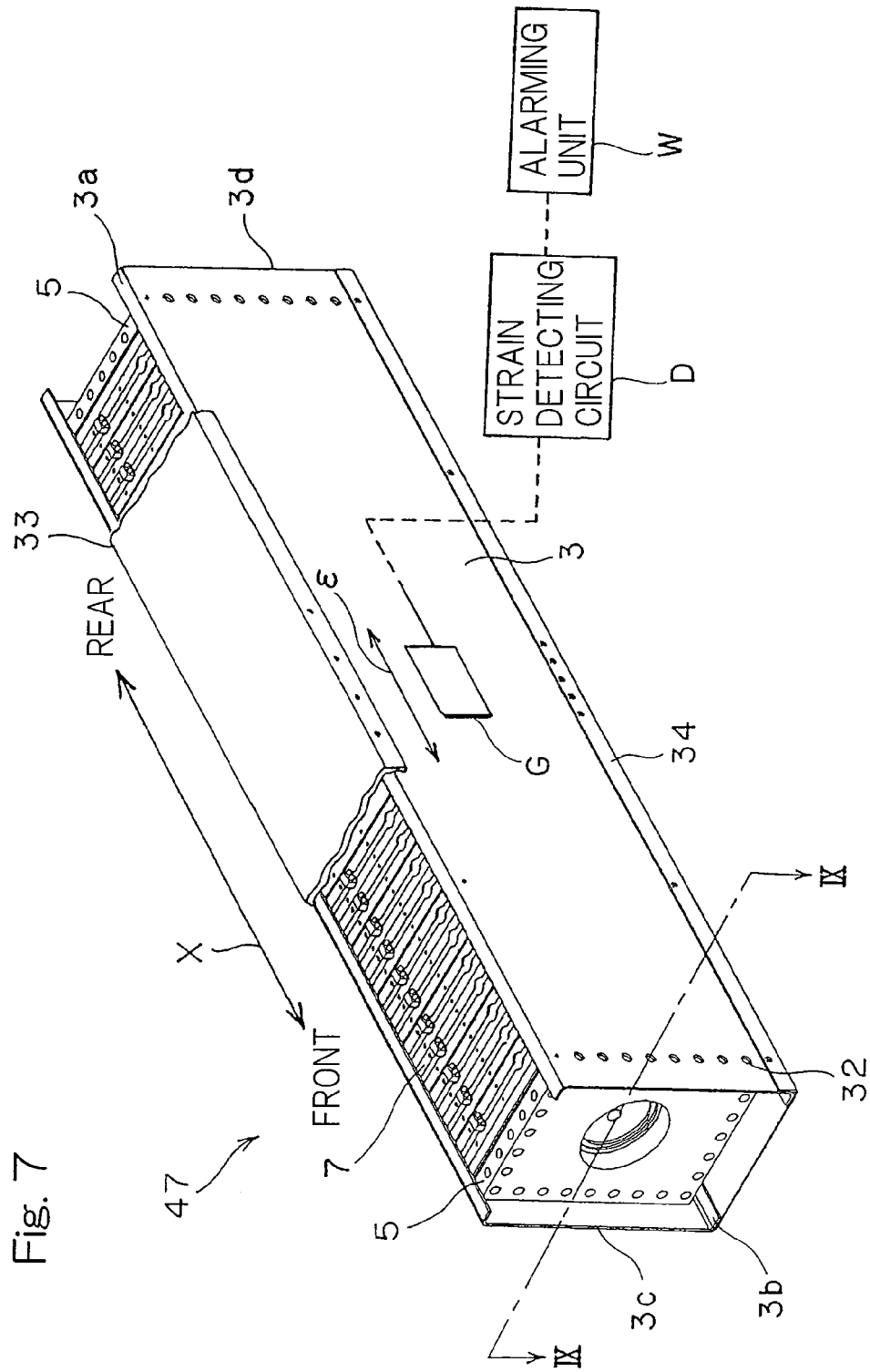
FIG. 7 is a perspective view showing the interior of a casing used to form the battery module shown in FIG. 1.

FIG. 7 illustrates a schematic perspective view showing, with apportion cut out, a module body 47, which is a major component of the battery module B and is accommodated within the casing 9 shown in FIG. 1. It is to be noted that in the description that follows, a positive electrode side of the cell stacked body 1 (a region forwardly of FIG. 7) is referred to as a "front side" whereas a negative electrode side thereof (a region opposite to the forward region of FIG. 7) is referred to as a "rear side". Opposite side faces of the cell stacked body 1 with respect to the direction X of stacking has respective side face plates 3 arranged thereat as a set of face plate members each extending in a direction along the direction X of stacking so as to cover the associated side faces of the cell stacked body 1. Each of the side face plates 3 and 3 has upper and lower edge portions 3a and 3b, opposed to each other in a direction perpendicular to the direction X of stacking, bent to protrude in a direction inwardly of the cell stacked body 1 at right angles relative to the remaining portion of the respective side face plates 3 and, accordingly, each side face plate 3 has a sectional shape representing a generally U-sectioned configuration having a shallow recess. In the vicinity of front and rear end portions 3c and 3d of the side face plates 3 with respect to the direction X of stacking, plate-like compressing members in the form of compressing plates 5 are secured by means of front and rear sets of side bolts 32, such that front and rear faces of the cell stacked body 1 with respect to the direction X of stacking are covered by the front and rear compressing plates 5 and 5. Also, upper and lower face plates 33 and 34, each being a plate-shaped member extending in the direction X of stacking, are arranged respectively upper and lower regions of the cell stacked body 1 with respect to the direction X of stacking. Each of the upper and lower face plates 33 and 34 has its left and right side edge portions bent at right angles relative to the remaining portion of the respective face plate 33 or 34 to allow each face plate 33 or 34 to have a sectional shape representing a generally U-sectioned configuration having a shallow recess. The upper and lower face plates 33 and 34 having the respective side edge portions so bent at right angles as hereinabove described are capped onto the cell stacked body 1 with those bent side edge portions overlapping the upper and lower edge portions 3a and 3b of the side face plates 3 and 3. The upper and lower face plates 33 and 34 are firmly secured to the side face plates 3 and 3 with those bent side edge portions connected with the upper and lower edge portions 3a and 3b of the side face plates 3 and 3 by means of set of bolts.

An substantially center surface region of the side face plate 3, which confronts outwardly, is preferably fitted with a strain gauge G operable as a strain detecting element for detecting a strain c acting mainly on the side face plate 3 in a direction conforming to the direction X of stacking, which is a forward and rearward direction. When this strain gauge G, although the use of it may be dispensed with if so desired, is mounted on the side face plate 3 in the manner described above, it becomes possible to assuredly and gas-tightly hold the battery module B by properly adjusting a clamping force with which the cell stacked body 1 is clamped in the direction X of stacking by means of clamping bolts 7.

Figure 8:
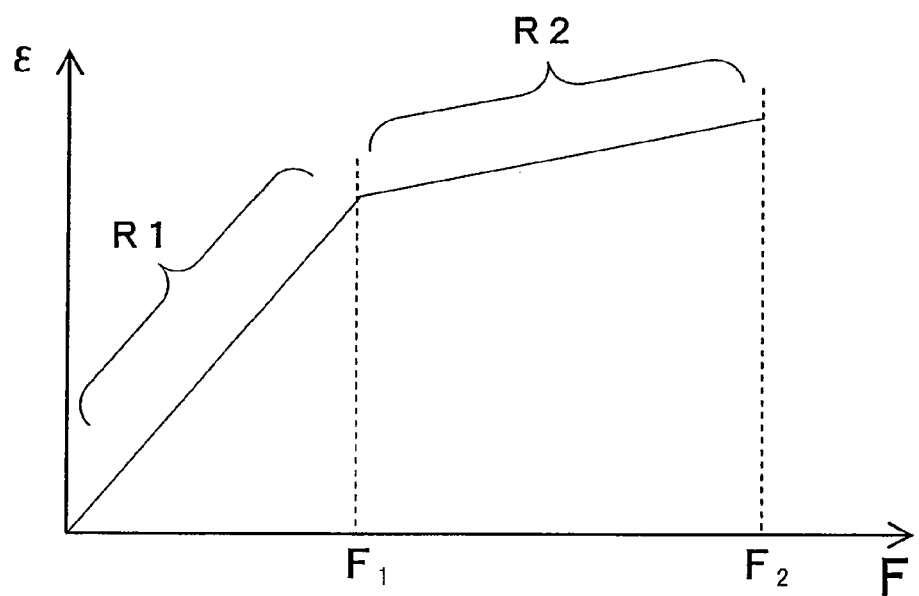
FIG. 8 is a chart showing the correlation between a clamping force and a strain occurring in a side plate in the module body shown in FIG. 7.

It has been found that such a relationship as shown in the correlation chart in FIG. 8 is established between the clamping force F, with which the cell stacked body 1 is clamped together in the direction X of stacking, and the strain 8 in the side face plate 3 in the direction X of stacking brought about by the clamping. Specifically, as the clamping force F increases, the strain ε increases, too. Referring to the correlation chart of FIG. 8, the strain c at a region R1, where the side face plate clamping force F is relatively small, is mainly brought about by compression of the electrode group 15 (FIG. 2) and the state of compression is substantially maintained. However, the strain at a region R2, where the clamping force F exceeds a predetermined value F1, is attributed not only to the compression of the electrode group 15, but also to deformation of the frame member 17. Therefore, it may occur that when the frame member 17 (FIG. 2) made of the electrically insulating material undergoes a plastic deformation, the clamping force F is slacked after the clamping force F has attained a value F2, which is a target value.

By detecting the slackening of the clamping force F as a reduction of the strains by the use of the strain gauge G, it is possible to secure the gas-tightness of the battery module B by retightening the clamping bolts 7 as required. This strain gauge G is electrically connected with a strain detecting circuit D operable in response to a detection signal fed from the train gauge G to detect the strain c. The strain detecting circuit D is in turn connected with an alarming unit W capable of issuing an alarm in the form of sound or light when the strain c attains a predetermined value, and this alarming unit W is fitted to, for example, an outer surface of the casing 9.

It is to be noted that the number of the strain gauge G to be used and the position of the strain gauge to be fitted to the module body 47 may not be always limited to those shown in connection with the embodiment in FIG. 7, but may be suitably increased and selected, respectively, depending on the desired or required accuracy with which the strain is to be detected.

Figure 9:
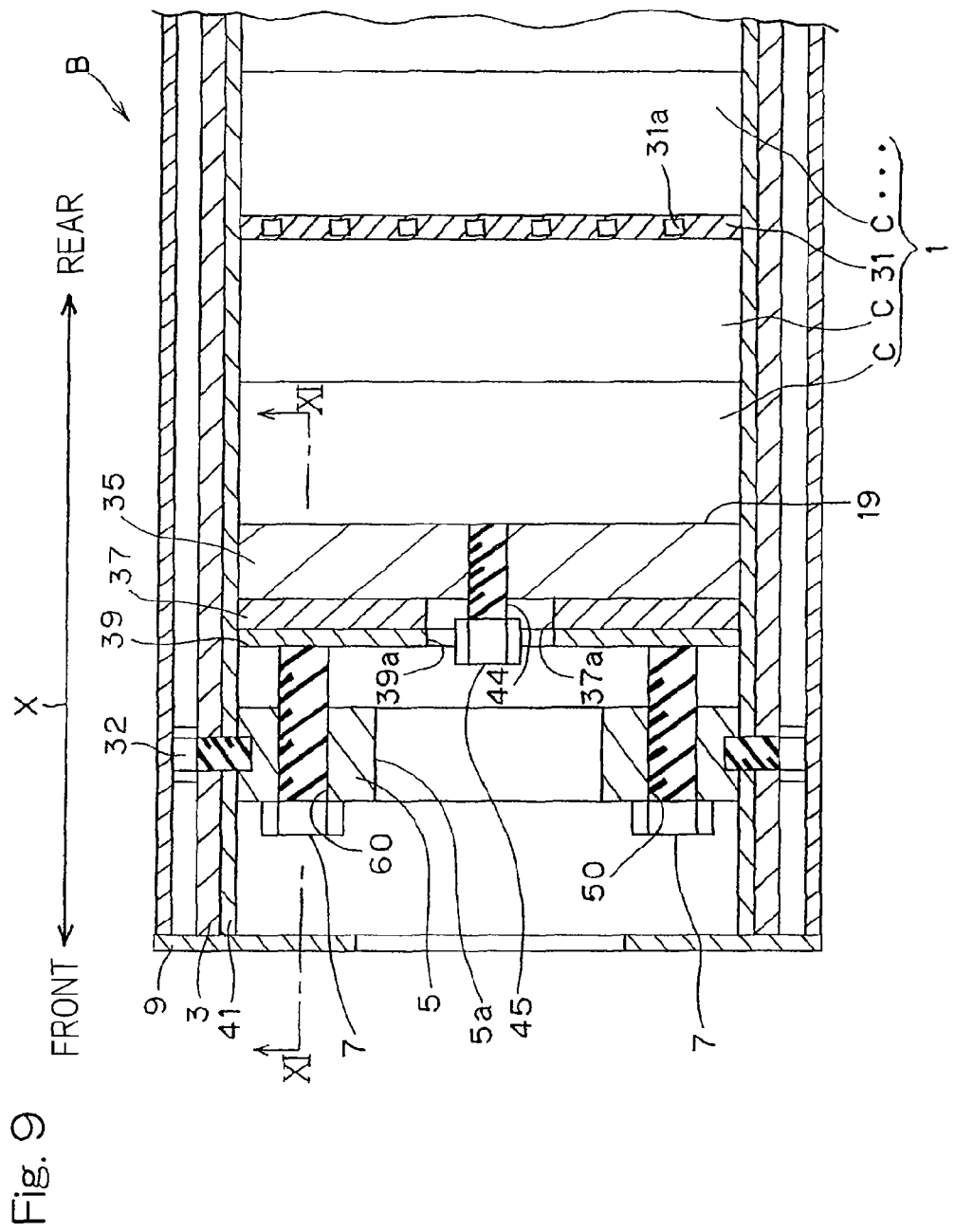
FIG. 9 is a fragmentary cross sectional view taken along the line IX-IX in FIG. 7.

FIG. 9 illustrates a cross sectional view taken along the line IX-IX in FIG. 7. As shown therein, a first collector plate 35, which serves as a collector member on the positive electrode side, is disposed in front of the first lid member 19 of one of the unitary cells C, which is positioned at the front end of the cell stacked body 1, in overlapped relation with such front unitary cell C. An insulating plate 37 and an insulating plate protective plate 39 are positioned forwardly of the first collector plate 35 in this specific order.

The compressing plate 5 is secured to a front end portion of each of the side face plates 3 by means of a plurality of side face bolts 32 passing through the respective side face plate 3 and a side face insulating plate 41 interposed between the respective side face plate 3 and the cell stacked body 1. The compressing plate 5 has a plurality of screw holes 60 one for each of the clamping bolts 7 that are clamping members, and each of those clamping bolts 7 is threadingly engaged in the respective screw hole 60 from forwards of the cell stacked body 1 in the direction X of stacking so as to extend completely through the compressing plate 5. Each clamping bolt 7 has a free end held in abutment with the insulating plate protective plate 39 to thereby urge the cell stacked body 1 through the insulating plate protective plate 39, the insulating plate 37 and the first collector plate 35 in a rearward direction parallel to the direction X of stacking. A structure similar to that shown in FIG. 9 and described above as employed at the front end of the cell stacked body 1 is also employed at the rear end of the cell stacked body 1. Accordingly, the cell stacked body 1 is pressed in a forward direction parallel to the direction X of stacking by means of the clamping bolts 7 then urging the insulating plate protective plate 39, the insulating plate 37 and a second collector plate (not shown). In this way, the cell stacked body 1 is clamped from front and rear thereof along the direction X of stacking by means of the bolts 7 supported by the respective front and rear compressing plates 5.

Figure 10A:
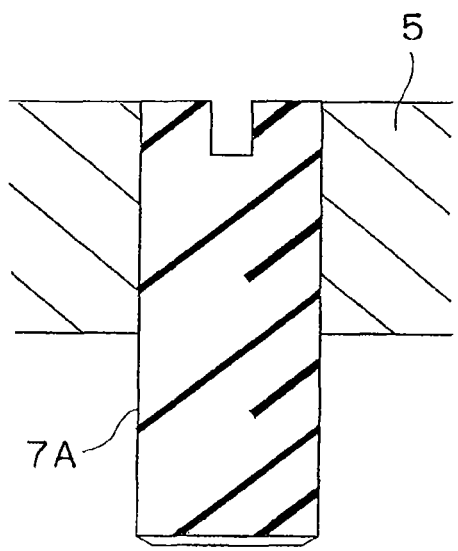
FIG. 10A is a schematic diagram showing an example of one of clamping members used to form the battery module according to one embodiment of the present invention.
Figure 10B:
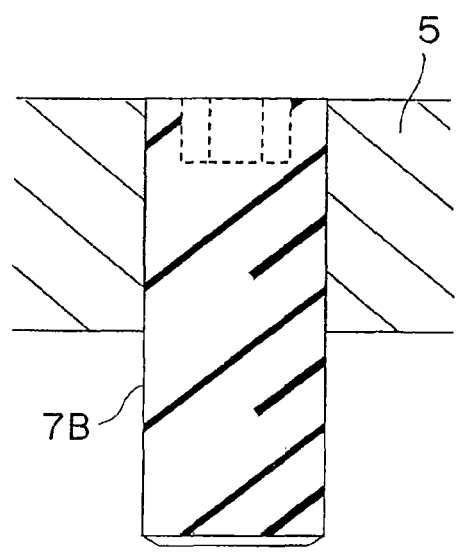
FIG. 10B is a schematic diagram showing another example of the clamping member used to form the battery module according to one embodiment of the present invention.

It is to be noted that for each of the clamping bolts 7, instead of the bolt having a bolt head as shown in FIG. 9, a headless screw member that has merely a shank such as, for example, a slotted set screw 7A as shown in FIG. 10A or a hexagon socket set screw 7B as shown in FIG. 10B may be employed. When the headless screw member is employed for each of the clamping members, a top face 7Aa or 7Ba of the set screw discussed above will not protrude outwardly from a surface of the compressing plate 5 and, therefore, the dimension of the battery module B in the direction X of stacking can be reduced.

Also, members supported by each of the front and rear compressing plates 5, which are used to clamp the cell stacked body 1 in forward and rearward directions parallel to the direction X of stacking, may not be always limited to the screw members such as the clamping bolts 7. By way of example, elastic members such as, for example, springs may be employed, in which case they may be interposed between each of the front and rear compressing plates 5 and the associated, front or rear insulating plate protective plate 39.

The insulating plate 37 has a round opening 37a defined in a center portion thereof and, similarly, the insulating plate protective plate 39 has a round opening 39a defined at a center portion thereof. Within those aligned round openings 37a and 39a, a positive electrode side terminal bolt 45, which functions as a positive electrode terminal of the battery module B, is threaded into a screw hole 44 defined at a substantially center portion of the first collector plate 35. Also, a center portion of the compressing plate 5 has an opening 5a defined therein for receiving therein an external member that is to be connected with the positive terminal bolt 45.

In the practice of the foregoing embodiment described above, the insulating plate protective plate 39 and the insulating plate 37 have the substantially same thickness and the first collector plate 35 has a thickness that is set to about four times the thickness of each of the insulating plate protective plate 39 and the insulating plate 37. Accordingly, the first collector plate 35 bears the pressure acting in the direction X of stacking of the cell stacked body 1. On the other hand, the insulating plate protective plate 39 protects the insulating plate 37 from the pressure at the free end of the clamping bolt 7 and, for this purpose, the insulating plate protective plate 39 is preferably made of a material having an excellent strength.

In the description that follows, a structure for connecting the casing 9 and the cell stacked body 1 will be described in detail. The casing 9 is a member employed to mechanically, thermally and electrically protect a module body 47 including the cell stacked body 1 and electroconductive members secured to the cell stacked body 1 such as the side face plates 3 and the compressing plates 5. Accordingly, material used to form the casing 9 is preferably in the form of an insulating material excellent in mechanical strength, heat resistance and resistance to the electrolyte used and, in the illustrated embodiment, the modified polyphenylene ether (PPE) resin is employed therefor.

Figure 11:
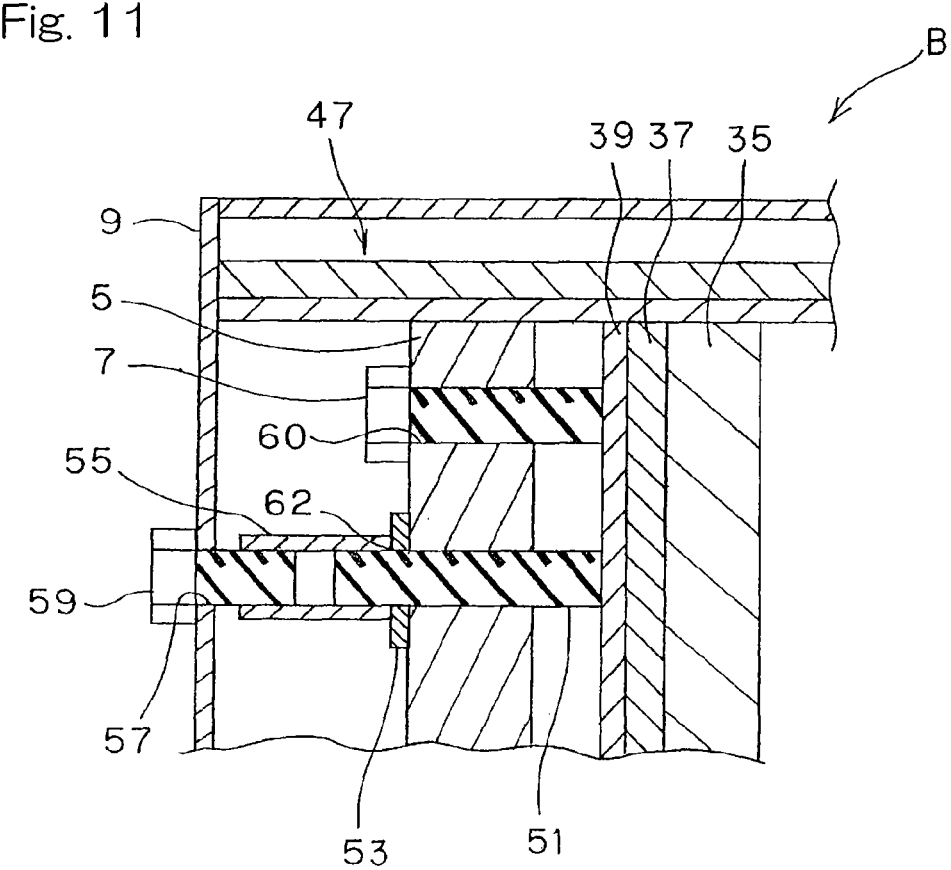
FIG. 11 is a sectional view taken along the line XI-XI in FIG. 9.

FIG. 11 illustrates a cross sectional view taken along the line XI-XI in FIG. 9, showing a structure necessary to mount the casing 9 on the module body 47. The compressing plate 5 is provided with not only the clamping bolt 7 having the bolt head as explained with reference to FIG. 7, but also a first casing mounting bolt 51, which is a member necessary to mount the casing 9 and which is threadingly engaged in a screw hole 62. This first casing mounting bolt 51 is a metallic member having only a threaded shank and has one end held in abutment with the insulating plate protective plate 39 and the other end having a metallic nut 53 and an internally threaded sleeve 55 of an electrically insulating material threaded thereon. By passing a second casing mounting bolt 59, made of an electrically insulating material, into a bolt insertion hole 57 defined in a front face of the casing 9 and then threadingly engaging this second casing mounting bolt 59 into the internally threaded sleeve 55, the casing 9 is mounted on the module body 47.

Figure 12:
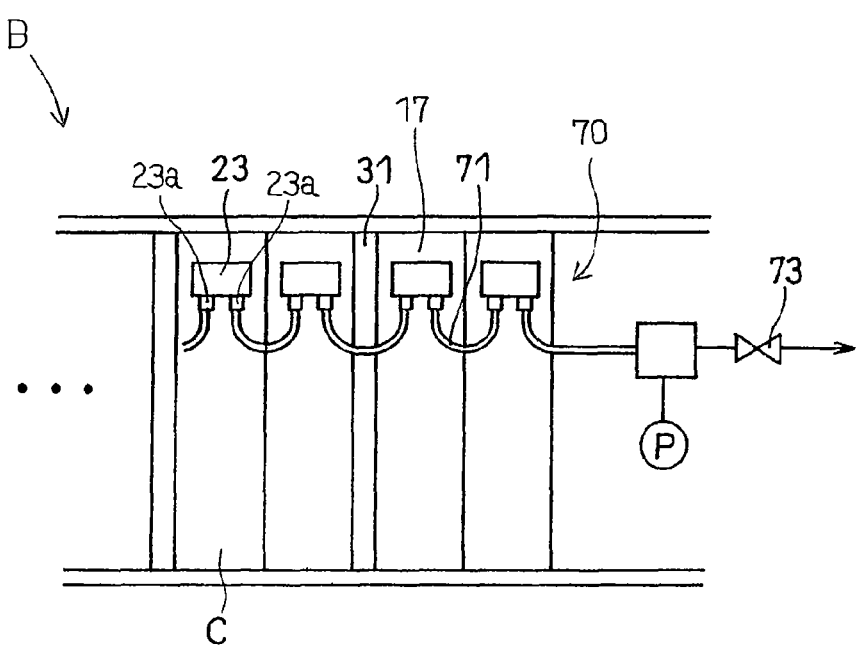
FIG. 12 is a schematic top plan view showing a pressure regulating mechanism employed in the battery module according to one embodiment of the present invention.

The battery module B according to the embodiment is provided with the pressure regulating mechanism 70, which is operable to purge the internal gases within the batteries to the outside when the internal pressure inside the cell stacked body 1, that is, the sum of the respective internal pressures of the unitary cells C forming the cell stacked body 1 attains a predetermined value, for example, 1 Mpa. More specifically, referring now to FIG. 12, the bifurcated discharge passageways 23a of the gas vent port 23 provided in each of the frame members 17 in the respective unitary cells C are fluid connected with one of the discharge passageways 23a of the gas vent port 23 in the next adjacent unitary cell C through respective flexible tubes 71, which forms a communication path. One of the discharge passageways 23a of the gas vent port 23 in the rearmost unitary cell C is fluid connected with a series circuit including a pressure gauge P for pressure monitoring purpose and a pressure regulating valve 73 whereas the other of the discharge passageways 23a of the gas vent port 23 in the front unitary cell C is sealed by a blank cap. The gas vent ports 23, the flexible communicating tubes 71, the pressure gauge P and the pressure regulating valve 73, all referred to above, altogether constitute the pressure regulating mechanism 70 of the battery module B. It is, however, to be noted that for the pressure regulating valve 73, a combination of a poppet valve with a spring element or any other known valve may be employed. As a matter of course, this pressure regulating valve functions as a safety or relief valve. It is also to be noted that the use of the pressure gauge P may be dispensed with if desired and that, where the possibility that the internal pressure of the cell stacked body 1 attains the predetermined value is low, the use of the pressure regulating mechanism 70 may be dispensed with.

Figure 13:
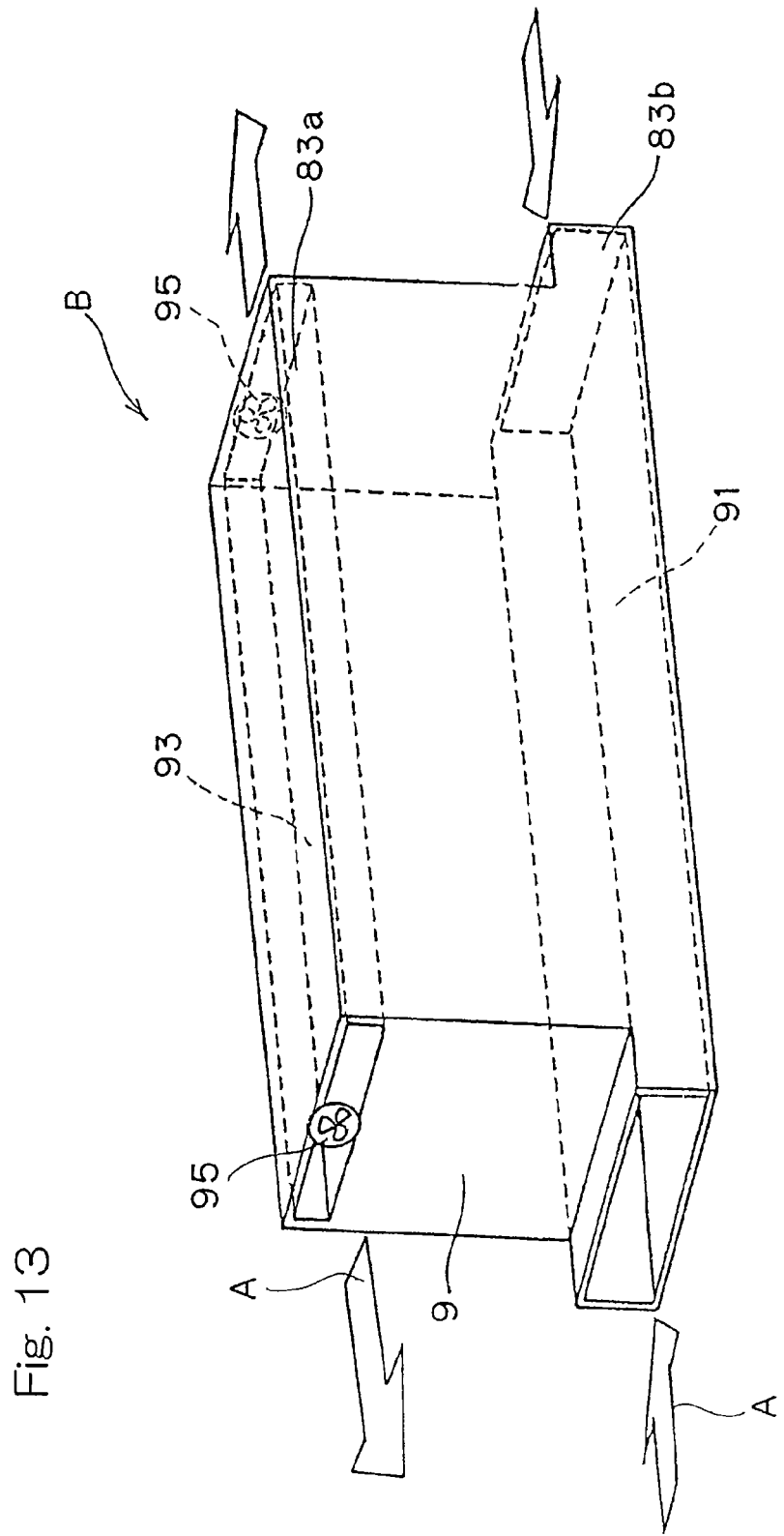
FIG. 13 is a perspective view showing a cooling structure in the battery module according to one embodiment of the present invention.

Referring again to FIG. 9, each of the heat sink plates 31 has a plurality of ventilation holes 31a, defined therein so as to extend in a direction perpendicular to the direction X of stacking, for the passage of cooling air therethrough. On the other hand, as best shown in FIG. 13, top and bottom portions 83a and 83b of the casing 9 for the battery module B are formed with an inflow duct 91 and an outflow duct 93, respectively, for the flow of a cooling air A serving as a coolant, and an exhaust fan 95 for forced cooling purpose is disposed in each of front and rear end walls of the upper portion 83a of the casing 9. Thus, it will readily be seen that the cooling air A introduced into the inflow duct 91 from front and rear openings of the bottom portion 83b by the effect of a discharge pressure induced by the exhaust fans 95 flows into the ventilation holes 31a in the heat sink plates 31, best shown in FIG. 9, to cool the unitary cells C through the associated heat sink plates 31 before it is eventually discharged to the outside by the exhaust fans 95 through the outflow duct 93 in the upper portion 83a. It is to be noted that in place of the exhaust fans 95 shown in FIG. 13, a suction fan (not shown) may be employed, in which case it may be disposed in each of front and rear end walls of the bottom portion 83b so that the cooling air may be introduced from the outside into the casing 9.

It is also to be noted that although in the foregoing embodiment, the heat sink plate 31 has been shown and described as employed every two unitary cells C, the number of the heat sink plates 31 employed and the position of those heat sink plates 31 may be suitably altered as desired. Also, for the coolant, other than the air A, a generally utilized coolant such as, for example, oil may be employed.

The use of the cooling system of the structure described hereinabove in the battery module B makes it possible to effectively cool the unitary cells C with a simplified structure and, therefore, the battery performance, particularly the long term charge and discharge cycle performance can be increased.

With the battery module B so constructed and so configured as hereinabove described in accordance with the embodiment, the following advantages can be appreciated. In this battery module B, the cell stacked body 1 is applied a pressure acting in the direction X of stacking by means of the clamping bolts 7 that are supported by the compressing plates 5 secured to the side face plates 3. In other words, the pressure acting in the direction X of stacking of the cell stacked body 1 is secured by the side face plates 3, which mechanically protect the cell stacked body 1 by covering respective side faces of the cell stacked body 1. Accordingly, since there is no need to use any extra members such as, for example, bolts for bearing the pressure acting in the direction X of stacking of the cell stacked body 1 separate from the members employed to protect the side faces of the cell stacked body 1, the battery module B can be advantageously reduced in size and weight. It is to be noted that the upper and lower face plates 33 and 34 covering respectively the upper and lower edges of the side face plates 3 are connected only with the side face plates 3 to thereby suppressing any possible expansion of the side face plates 3 outwardly.

Also, since in the embodiment hereinabove described, the side face plates 3 have the respective upper and lower edge portions 3a and 3b perpendicular to the direction X of stacking, which are bent at right angles relative to the remaining portions of those side face plates so as to protrude in a direction towards the cell stacked body 1, an undesirable swelling of each of the unitary cells C in a direction laterally thereof while the unitary cells C are stacked to define the cell stacked body 1 can be suppressed advantageously. The cell stacked body 1 tends to swell in a direction laterally of the cell stacked body 1 and also in respective directions upwardly and downwardly thereof upon increase of the internal pressure of one or some of the unitary cells C when the cell stacked body 1 is clamped in the direction X of stacking by means of the clamping bolts 7 during assemblage. However, in the embodiment hereinabove described, swelling of the cell stacked body 1 in the directions upwardly and downwardly thereof acts as a tensile force imposed on the side face plates 3 through the upper and lower edge portions 3a and 3b bent from the respective side face plates 3 and, therefore, an undesirable swelling of the cell stacked body 1 in the lateral direction thereof can be suppressed effectively. By the same token, an undesirable swelling of the cell stacked body 1 in the upward and downward directions thereof can also be suppressed effectively by the upper face plate 33 and the lower face plate 34 each having its left and right side edge portions bent at right angles relative to the remaining portion of the respective face plate 33 or 34.

In addition, the bending of the upper and lower edge portions 3a and 3b of each of the side face plates 3 does advantageously bring about an increase of the mechanical strength of the respective side face plate 3 and, therefore, with no need to use any extra reinforcement member, the plural battery modules B can be installed as stacked one above the other. Accordingly, installation of the battery module B in the vehicle or the like can be facilitated. An effect similar to that described above can also be obtained even with each of the upper and lower face plates 33 and 34 having its left and right side edge portions bent at right angles relative to the remaining portion of the respective face plate 33 or 34.

Also, since the clamping members, supported by the compressing members for clamping the cell stacked body 1 in the direction X of stacking, are formed as the clamping bolts 7 each threadingly engaged in the corresponding bolt hole defined in the associated compressing plate 5 so as to extend completely therethrough, assemblage of the battery module B can be facilitated and, moreover, after the assemblage of the battery module B, the pressure acting in the direction X of stacking of the cell stacked body 1 can be precisely adjusted by means of a simplified work of adjusting the extent to which each of the clamping bolts 7 is threaded. The value of the pressure acting in the direction X of stacking of the cell stacked body 1 is an important element that affects the performance of each of the unitary cells C and that of the battery module B and, therefore, if this can easily and accurately be adjusted, the quality of the battery module B can be highly precisely controlled.

Yet, in the battery module B according to the embodiment described hereinbefore, the first lid member 19 of one of the unitary cells C, which is positioned foremost of the cell stacked body 1 with respect to the direction X of stacking, and the second lid member 21 of another one of the unitary cells C, which is positioned rearmost of the cell stacked body 1 with respect to the direction X of stacking, are provided with respective sets of the first collector plate 35 and the second collector plate 35 arranged in overlapped relation to each other and the first and second collector plates 35 and 35 are brought into contact with the cell stacked body 1 by means of the clamping bolts 7, respectively. Accordingly, the surface area of contact between the unitary cells C and each of the collector plates 35 can be increased advantageously and, therefore, the contact resistance can be reduced. Therefore, it can be expected that the internal resistance of the battery module B is reduce and an increase of the battery efficiency can be obtained. In addition, an effect of avoiding an undesirable leakage of the electrolyte can be expected owning to the surface pressure in each of the unitary cells C.

Furthermore, since in this battery module B, the module body 47, comprised of, for example, the cell stacked body 1, the side face plates 3, the compressing plates 5 and the clamping bolts 7, all made of an electroconductive material, is enclosed within the casing 9 of a box-like configuration made of the electrically insulating material, the module body 47 can be electrically protected from the outside with a simplified structure. The casing 9 can be fitted to the body by the utilization of first casing fitting bolts and the compressing plates 5 for adding a pressure to the cell stacked body 1 in the direction X of stacking and through second casing fitting bolts each made of an electrically insulating material, and, therefore, the number of component parts required to fit the casing 9 can be minimized, thus making it possible to reduce the size and the weight of the battery module B.

Where the use is made of the pressure regulating mechanism 70 such as employed in the practice of the embodiment of the present invention, the internal pressure of the cell stacked body 1 can be maintained at a value lower than the predetermined value and, thus, the swelling of each of the unitary cells C can be suppressed assuredly. Also, since in the embodiment hereinbefore described, the provision has been made of the gas vent port 23 in each of the unitary cells C with its bifurcated discharge passageways 23a and 23a and since the discharge passageways 23a and 23a in one of the unitary cells C are fluid connected with the discharge passageways 23a and 23a of the next adjacent unitary cell C, the use of the only one pressure gauge P and the only one pressure regulating valve 73 is sufficient.

Although in describing the foregoing embodiment the or each unitary cell C has been shown and described as employed in the form of the nickel metal-hydride secondary battery, the present invention is not necessarily limited thereto and any type of primary battery or secondary battery, such as a nickel cadmium battery and a lithium ion battery may be employed. In addition, the pressure resistant structure of the present invention can be applied to an electric double layer capacitor or any other types of capacitors.

What is claimed is:

1. A sealed rectangular battery which comprises:
an electrode group having a positive electrode and a negative electrode; and
a cell casing for accommodating the electrode group and an electrolyte solution, made up of a rectangular frame member having a pair of openings and first and second lid members electrically connected with said electrode group;
wherein the first lid member is made of an electroconductive metallic plate and includes a substantially flat body portion for covering one of the openings of the frame member, and side portions protruding from the body portion substantially along at least one pair of sides of the frame member opposite to each other, each one of the side portions being formed by a single bend of the body portion in a direction towards the second lid member such that each side portion extends substantially parallel over a co-parallel side of the frame member from the bend to the opposite end of the side portion; and
wherein the second lid member is made of an electroconductive metallic plate and includes a body portion for covering the other of the openings of the frame member, and side portions protruding from the body portion of the second lid member substantially along at least one pair of sides of the frame member opposite to each other.

2. The sealed rectangular battery as claimed in claim 1, wherein the electrode group is of a structure including a positive electrode plate that forms the positive electrode, and a negative electrode plate that forms the negative electrode, the positive and negative electrode plates being alternately stacked together in a predetermined direction through a separator intervening between those positive and negative electrode plates and wherein each of the pair of side portions of the first and second lid members extends in the direction of stacking of the electrode group.

3. The sealed rectangular battery as claimed in claim 2, wherein the electrode group is of a stacked structure, in which the positive electrode plate that forms the positive electrode and the negative electrode plate that forms the negative electrode are alternately stacked together so as to confront each other through a pleated separator.

4. The sealed rectangular battery as claimed in claim 2, wherein the electrode group is of a stacked structure, in which the positive electrode plate that forms the positive electrode and the negative electrode plate that forms the negative electrode are alternately stacked together so as to confront each other through a separator having pockets.

5. The sealed rectangular battery as claimed in claim 1, wherein the first lid member includes four side portions formed by bending the body portion of the first lid member so as to extend substantially along respective four sides of the rectangular frame member; and wherein the second lid member includes four side portions formed by bending the body portion of the second lid member so as to extend substantially along respective four sides of the rectangular frame member.

6. The sealed rectangular battery as claimed in claim 1, wherein the frame member is made of an insulating material and wherein the first lid member is a positive electrode side terminal connected with the positive electrode and the second lid member is a negative electrode side terminal connected with the negative electrode.

7. The sealed rectangular battery as claimed in claim 1, wherein each of the first and second lid members is made of a nickel-plated steel material.

8. The sealed rectangular battery as claimed in claim 1, further comprising a terminal for use in monitoring a battery voltage.

9. A battery module comprising:
a cell stacked body of a substantially rectangular configuration formed by stacking a plurality of unitary cells, each being in the form of the sealed rectangular battery as defined in claim 1, the unitary cells being stacked together in a direction in which the first lid member of one of the neighboring unitary cells and the second lid member of the other of the neighboring unitary cells are opposed to each other;
a pair of side face reinforcing members extending along opposite side faces of the cell stacked body in the direction of stacking;
plate-shaped compressing members secured respectively to a front end portion and a rear end portion of the pair of the side face reinforcing members in the direction of stacking of the cell stacked body so as to cover front and rear regions of the cell stacked body; and
clamping members supported by the front and rear compressing members for clamping the cell stacked body from a front side and a rear side, respectively, in the direction of the stacking of the cell stacked body.

10. The battery module as claimed in claim 9, wherein each of the side face reinforcing members is in the form of a plate-shaped side face plate covering the corresponding side face of the cell stacked body, and the side face plate has opposite edge portions opposed along a vertical direction, which is perpendicular to the direction of stacking, the edge portions being bent towards the side of the cell stacked body.

11. The battery module as claimed in claim 9, wherein each of the clamping members is a screw member capable of being threadingly engaged in a screw hole defined in each of the compressing members.

12. The battery module as claimed in claim 11, wherein a pressure applied to the cell stacked body in the direction of stacking is adjustable depending on the extent to which the screw member is threaded.

13. The battery module as claimed in claim 9, further comprising a first collector member urged by the clamping member to contact the first lid member that forms an end portion of the cell stacked body, and a second collector member urged by the clamping member to contact the second lid member that forms the opposite end portion of the cell stacked body.

14. The battery module as claimed in claim 13, wherein each of the collector members is so arranged as to receive a pressure from the corresponding clamping member.

15. The battery module as claimed in claim 9, further comprising a casing made of an insulating material for covering a module body including the cell stacked body and electroconductive component parts fitted therearound.

16. The battery module as claimed in claim 9, further comprising a pressure regulating mechanism for discharging gases, developed inside the cell stacked body, to the outside in the event of increase of an internal pressure of the cell stacked body to a predetermined value.

17. A battery module comprising:
a cell stacked body of a substantially rectangular configuration formed by stacking a plurality of unitary cells, each being in the form of the sealed rectangular battery that includes,
an electrode group having a positive electrode and a negative electrode, and a cell casing for accommodating the electrode group and an electrolyte solution, made up of rectangular frame member and first and second lid members, the first lid member including a body portion for covering one of openings of the frame member, and side portions protruding from the body portion substantially along at least one pair of sides of the frame member opposite to each other;

the second lid member including a body portion for covering the other of the openings of the frame member, and side portions protruding from the body portion substantially along at least one pair of side of the frame member opposite to each other, and the first lid member being secured to the frame member with the side portions of the first lid member and the frame member being urged to each other by an internal pressure developed inside the cell casing, and the second lid member being secured to the frame member with the side portions of the second lid member and the frame member being urged to each other by an internal pressure developed inside the cell casing, the unitary cells being stacked together in a direction in which the first lid member of one of the neighboring unitary cells and the second lid member of the other of the neighboring unitary cells are opposed to each other;

a pair of side face reinforcing members extending along opposite side faces of the cell stacked body in the direction of stacking;

plate-shaped compressing members secured respectively to a front end portion and a rear end portion of the pair of the side face reinforcing members in the direction of stacking of the cell stacked body so as to cover front and rear regions of the cell stacked body; and clamping members supported by the front and rear plate-shaped compressing members for clamping the cell stacked body from a front side and a rear side, respectively, in the direction of the stacking of the cell stacked body; and a casing made of an insulating material for covering a module body including the cell stacked body and electroconductive component parts fitted therearound, wherein the casing is fitted to the module body by means of a first casing fitting member, which is a screw member and extends through the compressing member to fasten the cell stacked body, and a second casing fitting member, which is a screw member and is threadingly engaged with the first casing fitting member so as to extend through the casing.

18. The sealed rectangular battery as claimed in claim 1, wherein each one of the side portions of the first lid member extends substantially perpendicular to the body portion of the first lid member from the bend to the opposite end of the respective side portion.

* * * * *